(12) United States Patent
Wagner et al.

(10) Patent No.: US 7,614,040 B2
(45) Date of Patent: Nov. 3, 2009

(54) SYSTEM AND METHOD FOR EFFICIENTLY ANALYZING AND BUILDING INTERDEPENDENT RESOURCES IN A SOFTWARE PROJECT

(75) Inventors: Timothy Allen Wagner, Seattle, WA (US); Jess Garms, Seattle, WA (US)

(73) Assignee: BEA Systems, Inc., San Jose, CA (US)

( * ) Notice: Subject to any disclaimer, the term of this patent is extended or adjusted under 35 U.S.C. 154(b) by 799 days.

(21) Appl. No.: 10/983,766

(22) Filed: Nov. 8, 2004

(65) Prior Publication Data

US 2005/0262482 A1    Nov. 24, 2005

Related U.S. Application Data

(60) Provisional application No. 60/573,087, filed on May 22, 2004.

(51) Int. Cl.
*G06F 9/44* (2006.01)
*G06F 9/45* (2006.01)
*G06F 9/46* (2006.01)

(52) U.S. Cl. .............. 717/120; 717/121; 717/122; 717/144; 717/145; 717/168; 718/106

(58) Field of Classification Search .............. None
See application file for complete search history.

(56) References Cited

U.S. PATENT DOCUMENTS

| | | | | |
|---|---|---|---|---|
| 6,370,681 | B1 * | 4/2002 | Dellarocas et al. | 717/110 |
| 7,152,157 | B2 * | 12/2006 | Murphy et al. | 713/100 |
| 2002/0199170 | A1 * | 12/2002 | Jameson | 717/120 |
| 2004/0255273 | A1 * | 12/2004 | Chan | 717/120 |
| 2005/0022157 | A1 * | 1/2005 | Brendle et al. | 717/104 |

OTHER PUBLICATIONS

Krapp et al., "Graph-Based Models for Managing Development Processes, Resources, and Products", 2000, Springer-Verlag Berlin Heidelberg, pp. 455-474.*
Keller et al., "Dynamic Dependencies in Application Service Management", Jun. 2000, IBM Research Division, PDPTA 2000, pp. 1-7.*

* cited by examiner

*Primary Examiner*—Michael J. Yigdall
*Assistant Examiner*—Ben C Wang
(74) *Attorney, Agent, or Firm*—Squire, Sanders & Dempsey, LLP (57) ABSTRACT

A dynamic dependency representation 402 may be iteratively constructed and maintained as resources are changed, including resources that are automatically generated. A type differencing component 404 can be employed to more accurately identify when dependent resources should be analyzed or built. And an ordered task set 406 can be used to order the scheduled analysis or build tasks such that duplicate work is reduced or avoided.

21 Claims, 4 Drawing Sheets

SYSTEM AND METHOD FOR EFFICIENTLY ANALYZING AND BUILDING INTERDEPENDENT RESOURCES IN A SOFTWARE PROJECT

CLAIM OF PRIORITY

This application claims priority from the following application, which is hereby incorporated by reference in its entirety:

U.S. Provisional Patent Application No. 60/573,087, entitled SYSTEMS AND METHODS FOR EFFICIENTLY ANALYZING AND BUILDING INTERDEPENDENT RESOURCES IN A SOFTWARE PROJECT, filed May 22, 2004.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

FIELD OF THE INVENTION

The present disclosure relates generally to resolving dependencies in software components and, more particularly, improving the responsiveness of integrated development environments through improved dependency handling.

BACKGROUND

Software projects typically contain a collection of interdependent resources. For example, a source file may define a data type that extends or includes instances of one or more data types defined in other files, components or projects. Changes to a given resource may necessitate analysis or building of other resources that depend on that resource, such that the impact of the changes is reflected on the dependent resources and aspects of the given resource on which other resources depend still exists in the required form.

It is common to capture the dependencies between resources in a project in a separate file, sometimes called a "make" or "build" file. A software program (e.g., "make" or "ant") reads the set of dependencies in the file, examines the timestamps of the resources listed in the file to determine which ones are out of date (e.g., their associated source files have been modified), and uses the set of dependencies to determine which resources should be rebuilt based on which resources are out of date. The software program then rebuilds each resource that is out of date and each resource that depends on a resource that is out of date. There also exist automated versions of this process wherein a software development environment analyzes a software project, determines the set of resource dependencies, examines resource timestamps to determine which resources are out of date, and rebuilds each resource that is out of date or depends on a resource that is out of date.

Performing a full dependency analysis of a complex project from scratch can be time consuming. In addition, most dependency analysis and build systems assume that any change to a resource requires all resources that depend on that resource to be rebuilt. In reality, it may be that only a subset of possible resource changes requires dependent resources to be rebuilt. Consequently, these dependency analysis and build systems require more time and resources to rebuild a modified project than necessary.

These inefficiencies are wasteful in some environments, but particularly troublesome for "smart" interactive software development environments that attempt to provide a highly informative, responsive editing experience while analyzing and building the project in the background. These software development environments attempt to provide accurate, up to date information about the resources being edited based on their analysis of the those resources and their dependencies. For example, a software development environment may provide syntax coloring to highlight various aspects of the language grammar (e.g., type definitions, identifiers, methods signatures, comments, etc.) used in a source file. It may provide lists of available fields and methods based on its understanding of the types being used or extended. It may highlight known errors in the resources being edited.

To provide the best user experience, these environments attempt to identify errors as close to the moment they are introduced as possible and provide timely and helpful information about the resources being edited even as the other resources they depend on are being modified e.g. in a different window, by a different user or by synchronizing with a source control system. It is not desirable for the software development environment to pause or interrupt the user's typing while it performs dependency analysis or rebuilds a set of resources. Nor is it desirable for the software development environment to introduce a lengthy delay between the time a change is made and the time the analysis of the change is presented to the user.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one.

In the following description, numerous specific details are set forth to provide a thorough description of the invention. However, it will be apparent to one skilled in the art that the invention may be practiced without these specific details. In other instances, well-known features have not been described in detail so as not to obscure the invention.

Systems and methods in accordance herewith can improve upon existing dependency analysis and software build approaches. A dependency representation embodies resource dependency relationships. Although not limited to such, in aspects of these embodiments, the dependency representation can be a directed graph or other data structure capable of capturing dependency information. The dependency representation can be constructed when a project is created by analyzing the initial set of resources, if any, contained in the project. It can also be stored with the project and reloaded each time the project is accessed. Alternatively, the dependency representation can be constructed on an as-needed basis. In aspects of these embodiments, each change to a resource can be iteratively analyzed to determine whether it adds new references to external resources or removes old references to external resources.

Figure 1:
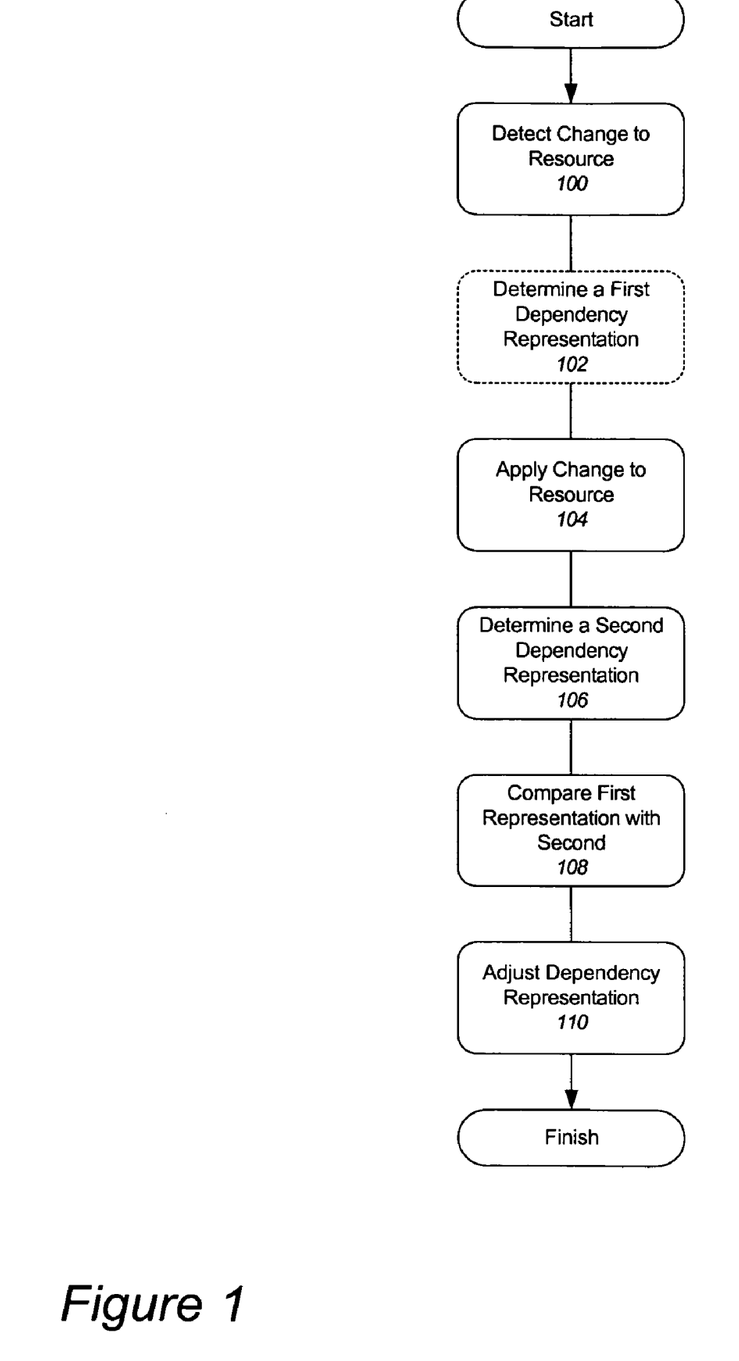
FIG. 1 is an exemplary flow chart illustrating updating of a dependency representation in accordance to various embodiments.

FIG. 1 is an exemplary flow chart illustrating updating of a dependency representation in accordance to various embodiments. Although this figure depicts functional steps in a particular order for purposes of illustration, the process is not necessarily limited to any particular order or arrangement of steps. One skilled in the art will appreciate that the various steps portrayed in this figure can be omitted, rearranged, performed in parallel, combined and/or adapted in various ways.

In various embodiments, new references to external resources are added to an overall dependency representation and old references that have been deleted are removed. In step 100, a resource can be analyzed for dependency changes each time the resource is generated (e.g., via meta-data-driven code generation) or modified. By way of illustration, a resource can be modified when a software developer alters source code in an editor. In an integrated development environment (IDE) 400, a process or thread monitoring changes to source code can provide programmatic notification of such. In other embodiments, dependency changes can be analyzed on a less frequent basis. In step 102, a first dependency representation for the changed resource is computed by analyzing the resource before the modifications are applied. (In another embodiment, the first dependency representation has already been determined and this step can be skipped.) By way of illustration, the analysis can be accomplished by lexing (lexical analysis and/or tokenization), parsing (syntactic and/or grammar-driven analysis), type resolution, namespace resolution, and other semantic analyses (e.g., dataflow-based analysis). Such techniques are well known in the art. Those of skill in the art will appreciate that the present disclosure is not dependent on or limited to any particular programming language, and may be used with one or more programming languages in combination.

In step 104, the modifications are applied to the resource. The resource is again analyzed by a program analyzer to determine a second dependency representation (step 106). By way of illustration, the analysis can be accomplished by lexing (lexical analysis and/or tokenization), parsing (syntactic and/or grammar-driven analysis), type resolution, namespace resolution, and other semantic analyses (e.g., dataflow-based analysis). By way of further illustration, external dependencies may be introduced on a resource based on the data types it uses as base types, as implemented interfaces, in method signatures, in method bodies and as field types, etc. In one embodiment, the result of each dependency analysis is stored persistently so the system does not need to recompute this result before the next set of changes is applied and analyzed.

In step 108 a comparison is performed between the first and second dependency representations and adjustments to the overall dependency representation, if any, are made in step 110. A new dependency is added to the overall dependency representation for each dependency that exists in the second dependency representation, but does not exist in the first. Likewise, a dependency is removed from the overall dependency representation for each dependency that exists in the first dependency representation, but does not exist in the second. Thus, in various embodiments the dependency representation can be iteratively computed and kept up to date according to each resource change, or on a less frequent basis.

Figure 2:
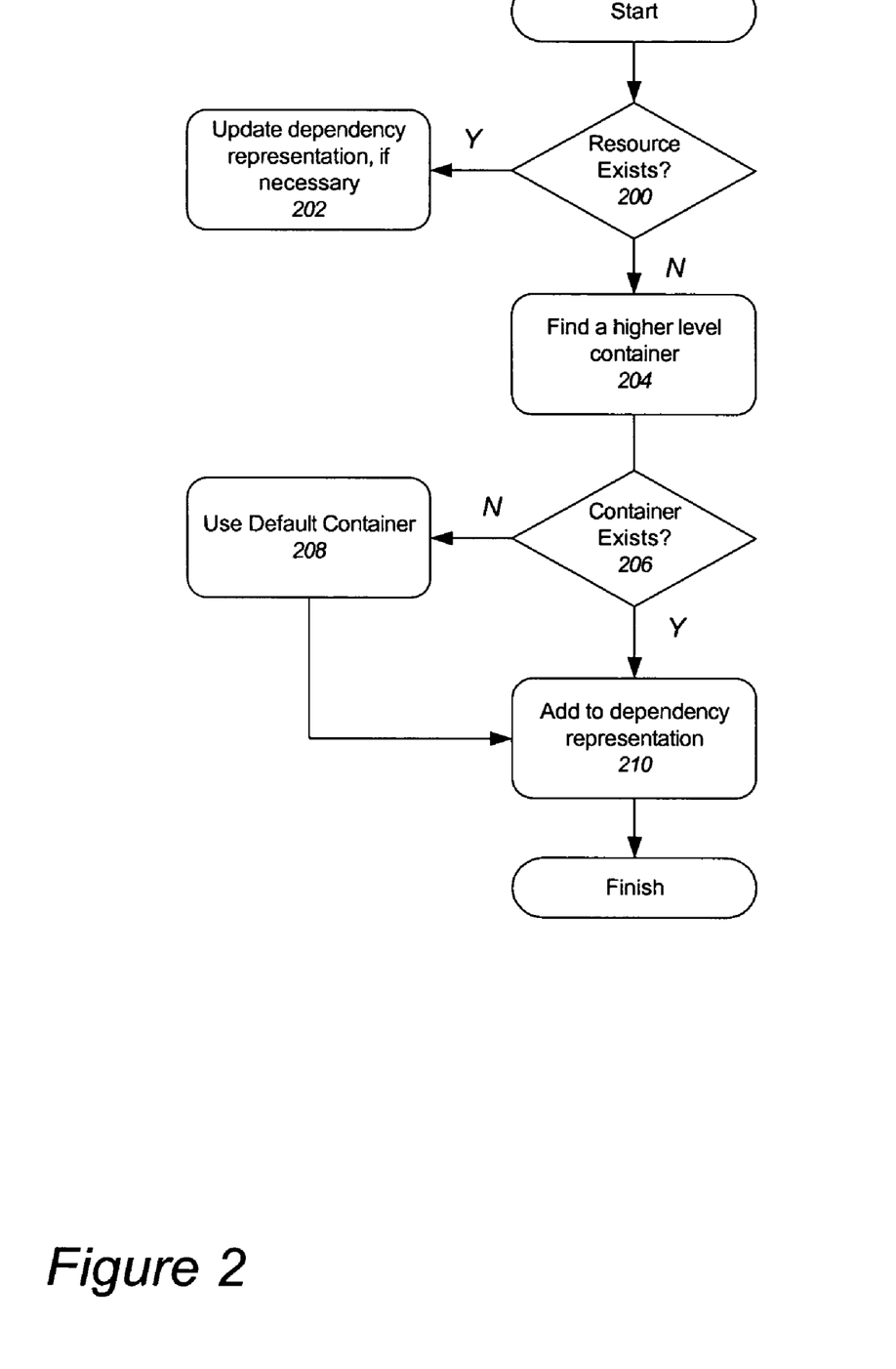
FIG. 2 is an exemplary flow chart illustrating how resources are added to the resource representation in accordance to various embodiments.

FIG. 2 is an exemplary flow chart illustrating how resources are added to the resource representation in accordance to various embodiments. Although this figure depicts functional steps in a particular order for purposes of illustration, the process is not necessarily limited to any particular order or arrangement of steps. One skilled in the art will appreciate that the various steps portrayed in this figure can be omitted, rearranged, performed in parallel, combined and/or adapted in various ways.

In various embodiments, dependencies on resources that do not exist are recorded as dependencies on an entity that logically contains that resource (e.g., on the package, directory, library or other suitable container). By way of illustration, a source file imports and uses an externally defined type such as:

```
import com.bea.widgets.WingDing
...
void myMethod(WingDing w) {
    w.doSomeCoolWingDingStuff( )
...
}
```

The source file depends on the externally defined WingDing type (i.e., class). Ideally, a smart source code editor would understand the WingDing type so it could offer syntax highlighting, command completion and error detection, for example. When the WingDing source file is eventually created, the system remembers that the file depends on the WingDing type and henceforth will utilize the now complete WingDing definition.

In step 200, if the system cannot find the definition for a resource (e.g., WingDing), the system attempts to locate an entity that logically contains the resource (step 204). Without loss of generality, if the entity that logically contains the resource does not exist, the dependency is recorded on the entity that logically contains the entity that logically contains the resource and so forth. If no entities that logically contain the resource exist (step 206), the dependency is recorded on a default container (step 208). In this illustration, the entity that logically contains the WingDing type is the com.bea.widgets package. If that package does not exist, the system creates a dependency pointing to the com.bea package and so forth. If none of the needed packages exist, we place a dependency on the "default package", which always exists. The dependency is then added to the dependency representation in step 210.

Resources having definitions are added to the dependency representation in step 202. The dependency representation is checked to see if the resource being added completes or resolves the existence of any entities in the representation that contain undefined resources. If the dependencies on one or more resource containers are resolved by the existence of the resource, the dependencies on those resource containers are moved to the newly added resource (i.e., that was previously missing) in step 202.

In various embodiments, problems with existing dependency analysis and software build approaches are overcome by utilizing a type differencing component to more accurately identify when dependent resources should be analyzed or built. Unlike previous dependency analysis and software build approaches that assume resources must be analyzed or built whenever a resource they depend on is modified, various embodiments of the present disclosure examine changes more closely to determine if they impact any of the portions of the resource that are visible externally and as such may be referenced by other resources. External resources can only depend on portions of a resource that may be referenced externally. Therefore, this process more accurately represents the dependencies between resources.

In aspects of these embodiments and by way of illustration, the set of externally visible portions of a resource includes one or more of the following items defined in the resource:

names of non-private types;

super-types of non-private types;

non-private interfaces implemented by non-private types;

non-private methods implemented by non-private types;

non-private constructors implemented by non-private types;

parameters and return type of non-private methods and constructors implemented by non-private types;

exceptions thrown by non-private methods and constructors implemented by non-private types;

modifiers of non-private methods and constructors implemented by non-private types (these can include whether the method or constructor is static, abstract, final or deprecated and the access rights of the method or constructor);

non-private fields implemented by non-private types;

types of non-private fields implemented by non-private types;

constant values; and annotations (e.g., for meta-data-driven code generation).

In aspects of these embodiments and by way of further illustration, the externally visible portions of a resource include (but are not limited to) one or more of: primitive types, complex types, array types and annotations.

In various embodiments, the addition, removal or modification of an item in the set of externally visible portions of a resource can cause the system to schedule resources that depend on the resource to be analyzed or built. It is desirable to bring resources in a project/application as up-to-date as quickly as possible since dependency information can be used interactively for answering find-uses queries, driving refactoring, updating diagnostics, implementing "go to definition", computing a minimal set of files to compile when updating class files in response to a request for deployment, etc.

In one embodiment, determining which resources need to be analyzed or built can be accomplished by using a dependency graph to enact a transitive closure over resources dependent on the changed information. By way of illustration, if method A calls method B, there can be a dependency arc in the graph from A to B and an anti-dependency arc from B to A. If there is a change to B's externally visible portion, the system will know that A depends upon it by way of the anti-dependency arc. In one embodiment, when a resource is modified, its anti-dependencies are traversed to all resources which depend on it. Likewise, these resources can have anti-dependency arcs which can also be traversed, and so on. However, traversing along a particular dependency path stops when the system notices that a change to a resource does not impact the resource's externally visible portion. For example, if B's implementation had changed but not its public signature, A would not need to be built or analyzed as a result.

Analysis and software build components can implement an ordered task set to manage scheduled analysis and build tasks and reduce duplicate work. In one embodiment, the ordered task set is a first in, first out queue containing the list of tasks to be executed. In aspects of this embodiment, attempting to add a task that already exists in the ordered task set does not result in a new task being added, such that duplicate entries in the task set are avoided.

Figure 3:
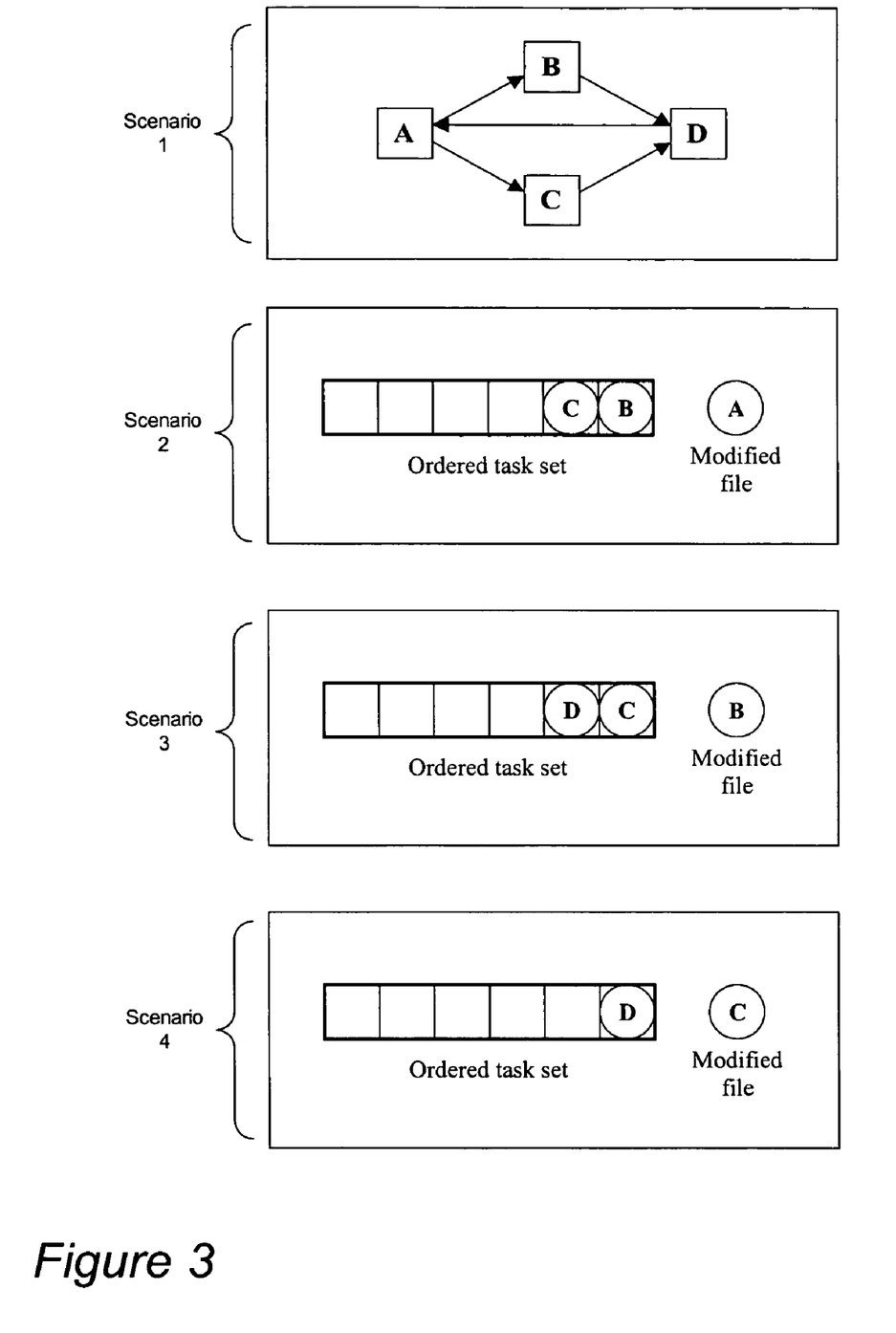
FIG. 3 illustrates exemplary resource build scheduling in accordance to various embodiments.

FIG. 3 illustrates exemplary resource build/analysis scheduling in accordance to various embodiments. Scenario 1 in FIG. 3 illustrates a set of dependencies between resources in a software project. The software project contains the resources A, B, C and D. Resource A depends on resources B and C, resource B depends on resource D, resource C depends on resource D and resource D depends on A. Scenario 2 illustrates the contents of the ordered task set after modifying externally visible portions of resource A (e.g., a method signature). In this case, resources B and C are placed on the ordered task set because they depend on A. Scenario 3 illustrates the contents of the ordered task set assuming that the change to resource A caused a change to the externally visible portions of resource B (e.g., if B defines a type that extends a type modified in resource A). In this case, resource D is placed on the ordered task set because it depends on resource B. Scenario 4 illustrates the contents of the ordered task set assuming that the change to resource A also caused a change to the externally visible portions of resource C. Note that even though D depends on C, no new tasks are added to the ordered task set because a task to analyze resource D already exists on the ordered task set. Thus, duplicate analysis or building of resource D is avoided.

Figure 4:
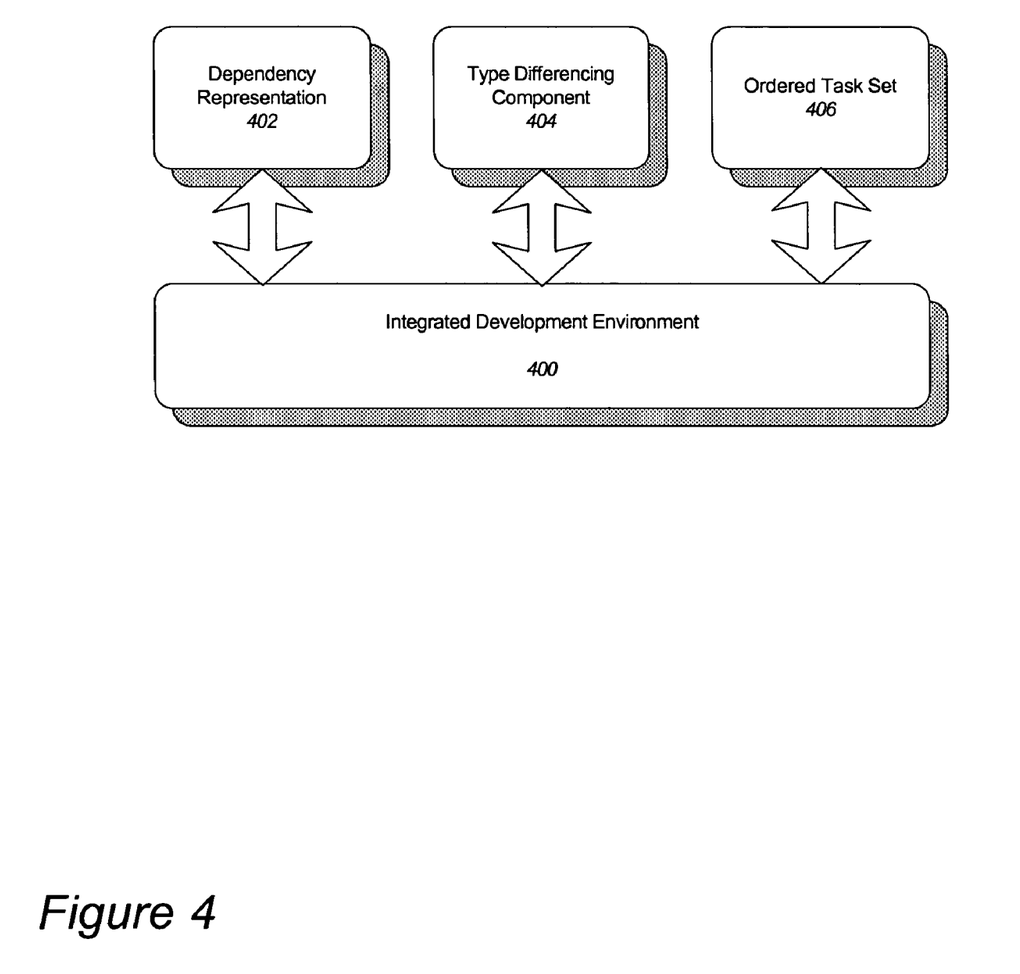
FIG. 4 is an exemplary illustration of a system in accordance to various embodiments.

FIG. 4 is an exemplary illustration of a system in accordance to various embodiments. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

In various embodiments, and as illustrated in FIG. 4, a dynamic dependency representation 402 may be iteratively constructed and maintained as resources are changed, including resources that are automatically generated. A type differencing component 404 can be employed to more accurately identify when dependent resources should be analyzed or built. And an ordered task set 406 can be used to order the scheduled analysis or build tasks such that duplicate work is reduced or avoided. In aspects of these embodiments, these components can be utilized by IDE 400 in order to improve efficiency and the user experience. Alternate embodiments can use one or more of these components as part of systems that analyze and/or build software (e.g., parsers and compilers).

In various embodiments, the system can include a mechanism for analyzing automatically generated resources, incorporating type information associated with the automatically generated resources and resolving dependencies on that type information. In these embodiments, the analysis and/or building of a resource may result in the automatic generation of additional resources. Automatically generated resources can contain definitions that resolve dependencies specified in one or more resources in the project. In aspects of these embodiments, the system can use meta-data (and the content of a source code annotation) to drive the code generation process, the result of which (after further compilation of the generated artifact) enables satisfaction of the type reference to the generated material.

By way of illustration, the code fragment below illustrates a Java® file designed to automatically generate another file:

```
@WebServicecontrol ("creditcheck. wsdl")
CreditCheckControl creditCheckService = new
    CreditCheckControl ( );
creditCheckService.getIRSReport ("123-45-6789");
```

The first line of this code fragment contains a Java® meta-data annotation intended to automatically generate a new Java® class for interacting with the web service described in the specified Web Service Description Language (WSDL) file (i.e., "creditcheck.wsdl"). Without loss of generality, this illustration assumes the name of the generated class will be CreditCheckControl. The second line of this code fragment creates an instance of the generated CreditCheckControl class and the third line of this code calls a method on the generated class to obtain credit data from the IRS associated with a given social security number.

In various embodiments, when the parsing, analysis or processing of a resource results in the automatic generation of additional resources, those resources are also analyzed to determine the new resources they define. By way of illustration, the system can use a generated file as a proxy for the file that authored it (e.g., the original Java® file "masters" the dependencies, but they are computed by first calculating dependencies on the generated files in the normal fashion, then translating them so that they appear to have come from the master/authoring file). If a new resource satisfies previously unresolved dependencies, those dependencies are resolved and added to the dependency graph. Consequently, the system is able to provide detailed information about automatically generated resources while editing the files that depend on these resources. In one embodiment, this information can be surfaced through the IDE to the user as one or more of syntax highlighting, command completion and real-time error detection.

In one embodiment, a parser can use its grammar to recognize that @WebServiceControl is a Java® meta-data annotation (this kind of meta-data is a standard part of Java 5.0 aka Java 1.5). The parser looks for an annotation-handler associated with this particular annotation in its list of registered annotation handlers. If an annotation-handler is found, the parser asks the annotation-handler to process the annotation and report any e.g. semantic errors back to the parser. The annotation handler examines the WSDL file, generates the required source file and reports any errors. The annotation handler may generate the new file in the current project directory, which the IDE or compiler framework monitors for new files. Alternately, the annotation handler may inform the compiler that it has generated a new file that needs to be parsed through the API. The compiler compiles the new source file and resolves any dependencies on the types it defines, including those in the original source file that caused the annotation-handler to be invoked.

Various embodiments may be implemented using a conventional general purpose or specialized digital computer(s) and/or processor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits and/or by interconnecting an appropriate network of component circuits, as will be readily apparent to those skilled in the art.

Various embodiments include a computer program product which is a storage medium (media) having instructions and/or information stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage devices, ROMs, RAMs, EPROMs, EEPROMs, DRAMs, PRAMS, VRAMs, flash memory devices, magnetic or optical cards, nano-systems (including molecular memory ICs); paper or paper-based media; and any type of media or device suitable for storing instructions and/or information. Various embodiments include a computer program product that can be transmitted in whole or in parts and over one or more public and/or private networks wherein the transmission includes instructions and/or information which can be used by one or more processors to perform any of the features presented herein. In various embodiments, the transmission may include a plurality of separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments/containers, user interfaces and applications.

The execution of code can be direct or indirect. The code can include compiled, interpreted and other types of languages. Unless otherwise limited by claim language, the execution and/or transmission of code and/or code segments for a function can include invocations or calls to other software or devices, local or remote, to do the function. The invocations or calls can include invocations or calls to library modules, device drivers and remote software to do the function. The invocations or calls can include invocations or calls in distributed and client/server systems.

The foregoing description of the preferred embodiments of the present invention has been provided for purposes of illustration and description. It is not intended to be exhaustive or to limit the invention to the precise forms disclosed. Many modifications and variations will be apparent to the practitioner skilled in the art. Embodiments were chosen and described in order to best explain the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A computer readable storage memory for storing data for access by an application program being executed on a data processing system, comprising:
   a data structure stored in said memory, said data structure including information that embodies resource dependency relationships of a plurality of resources used by said application program and including:
   a plurality of nodes stored in said memory, each of said nodes representing information pertaining to one of: a resource of the plurality of resources and an entity that logically contains a resource of the plurality of resources;

one or more referent attributes for each of said nodes, wherein each referent attribute of the one or more referent attributes unidirectionally associates a first node of the plurality of nodes with a second node of the plurality of nodes, and wherein the resource or entity of the first node is dependent on the resource or entity of the second node; and wherein a node in the plurality of nodes representing an entity that logically contains a resource is resolved to the resource when the definition of the resource is discovered;

a type differencing component capable of determining, for a first software resource that is modified, whether the modification is visible externally so that the modification is referenced by a second software resource; and an ordered task set capable of scheduling tasks associated with the plurality of resources such that there are no duplicate tasks, wherein said ordered task set contains a list of tasks to be executed based on a modification of the resource dependency relationships of the plurality of resources, and wherein a task of the list of tasks can perform one of:

analysis of a resource associated with the task; and building of a resource associated with the task.

2. The memory of claim 1 wherein:

the application program is one of: an integrated development environment (IDE), a parser and a compiler.

3. The memory of claim 1 wherein:

a resource includes is one of: a data type, a component and a project.

4. A computer-implemented method for representing resource dependency relationships for software development, comprising:

determining a first dependency representation of a resource of a plurality of resources;

detecting a change to the resource, wherein the resource is a software resource and the detecting comprises determining if the change modified a portion of the software resource that is visible externally so that the change can be referenced by other software resources;

determining a second dependency representation based on the change to the resource;

comparing the first dependency representation with the second dependency representation; and modifying a third dependency representation based on the comparing, wherein a new dependency is added to the third dependency representation for each dependency that exists in the second dependency representation but does not exist in the first dependency representation, and wherein a dependency is removed from the third dependency representation for each dependency that exists in the first dependency representation but does not exist in the second dependency representation; and constructing an ordered task set capable of scheduling tasks associated with the plurality of resources such that there are no duplicate tasks, wherein said ordered task set contains a list of tasks to be executed based on a modification of the resource dependency relationships of the plurality of resources, and wherein a task of the list of tasks can perform one of:

analysis of a resource associated with the task; and building of a resource associated with the task.

5. The method of claim 4 wherein:

if the new dependency is on an undefined resource, it is treated as a dependency on an entity that logically contains the undefined resource.

6. The method of claim 5, further comprising:

resolving the entity that logically contains the undefined resource to be the definition of the undefined resource.

7. The method of claim 4 wherein:

a resource is one of: a data type, a component and a project.

8. The method of claim 4 wherein:

the portion comprises at least one of: primitive types, complex types, array types or annotations.

9. The method of claim 8 wherein:

the other software resources can only depend on the portion if it is visible externally.

10. The method of claim 4 wherein:

a dependency representation is a directed graph.

11. The method of claim 4 wherein:

using an integrated development environment capable of performing the method of claim 4.

12. The method of claim 4 wherein:

using a compiler capable of performing the method of claim 4.

13. The method of claim 4 wherein:

using a program analyzer capable of performing the method of claim 4.

14. A computer-implemented method for operating on a plurality of software resources, comprising:

providing information that embodies resource dependency relationships of the plurality of resources used by an application program;

determining a subset of the plurality of resources wherein the subset includes resources in the plurality of resources that have been changed such that the change is externally visible to other resources, wherein an externally visible change is a modification to a portion of a resource wherein the portion is referenced by other resources;

incorporating type programming language data information associated with automatically generated resources and resolving dependencies based on the programming language data type information;

placing a task for each resource in the subset into an ordered task set such that there are no duplicate tasks, wherein said ordered task set contains a list of tasks to be executed based on a modification of the resource dependency relationships of the plurality of resources;

wherein a task can perform one of: analysis of a resource associated with the task and building of a resource associated with the task;

wherein a resource is one of: a data type, a component and a project.

15. The method of claim 14, further comprising:

performing a task in the ordered task set.

16. The method of claim 14 wherein:

the plurality of resources is represented as a directed graph.

17. The method of claim 14 wherein:

using an integrated development environment capable of performing the method of claim 14.

18. The method of claim 14 wherein:

using a compiler capable of performing the method of claim 14.

19. The method of claim 14 wherein:

using a program analyzer capable of performing the method of claim 14.

20. A computer-readable storage medium having instructions stored thereon that, when executed by a processor, cause the processor to provide a software development application comprising:
   an integrated development environment;
   a dependency representation capable of being iteratively updated as any of a plurality of resources are changed;
   a type differencing component capable of determining, for a first software resource that is modified, whether the modification is visible externally so that the modification is referenced by a second software resource; and
   an ordered task set capable of scheduling tasks associated with the plurality of resources such that there are no duplicate tasks, wherein said ordered task set contains a list of tasks to be executed based on a modification of the resource dependency relationships of the plurality of resources; and
   wherein a task of the list of tasks can perform one of: analysis of a resource associated with the task and building of a resource associated with the task.

21. A computer-readable storage medium having instructions stored thereon to cause a system to:
   determine a first dependency representation;
   detect a change to a resource, wherein the resource is a software resource and the detecting comprises determining if the change modified a portion of the software resource that is visible externally so that the change can be referenced by other software resources;
   determine a second dependency representation based on the change to the resource;
   compare the first dependency representation with the second dependency representation;
   modify a third dependency representation based on the comparing; and construct an ordered task set capable of scheduling tasks associated with the plurality of resources such that there are no duplicate tasks, wherein said ordered task set contains a list of tasks to be executed based on a modification of the resource dependency relationships of the plurality of resources, and wherein a task of the list of tasks can perform one of: analysis of a resource associated with the task; and building of a resource associated with the task
   wherein a new dependency is added to the third dependency representation for each dependency that exists in the second dependency representation but does not exist in the first dependency representation; and
   wherein a dependency is removed from the third dependency representation for each dependency that exists in the first dependency representation but does not exist in the second dependency representation.

* * * * *

UNITED STATES PATENT AND TRADEMARK OFFICE
CERTIFICATE OF CORRECTION

PATENT NO. : 7,614,040 B2 Page 1 of 1
APPLICATION NO. : 10/983766
DATED : November 3, 2009
INVENTOR(S) : Timothy Allen Wagner et al.

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 799 days.

should read

(*) Notice: Subject to any disclaimer, the term of this patent is extended or adjusted under 35 U.S.C. 154(b) by 1,297 days.

In column 4, line 21, delete "Coo1" and insert -- Cool --, therefor.

In column 5, line 42, delete "go to" and insert -- goto --, therefor.

Signed and Sealed this

Seventeenth Day of August, 2010

David J. Kappos
*Director of the United States Patent and Trademark Office*